(12) United States Patent
Zhu et al.

(10) Patent No.: US 11,500,245 B1
(45) Date of Patent: Nov. 15, 2022

(54) BACKLIGHT MODULE AND DISPLAY DEVICE

(71) Applicant: Xiamen Tianma Microelectronics Co., Ltd., Xiamen (CN)

(72) Inventors: Zhiqiang Zhu, Xiamen (CN); Yaozuo Ke, Xiamen (CN)

(73) Assignee: Xiamen Tianma Microelectronics Co., Ltd., Xiamen (CN)

( * ) Notice: Subject to any disclaimer, the term of this patent is extended or adjusted under 35 U.S.C. 154(b) by 0 days.

(21) Appl. No.: 17/690,029

(22) Filed: Mar. 9, 2022

(30) Foreign Application Priority Data

Dec. 30, 2021 (CN) .......................... 202111654597.8

(51) Int. Cl.
*G02F 1/13357* (2006.01)
*F21V 8/00* (2006.01)

(52) U.S. Cl.
CPC ..... *G02F 1/133603* (2013.01); *G02B 6/0036* (2013.01); *G02B 6/0038* (2013.01); *G02B 6/0061* (2013.01); *G02B 6/0076* (2013.01); *G02F 1/133605* (2013.01); *G02F 1/133606* (2013.01)

(58) Field of Classification Search
CPC ......... G02F 1/133603; G02F 1/133605; G02F 1/133606; G02F 1/133611; G02F 1/133615; G02B 6/0076; G02B 6/0038; G02B 6/0058; G02B 6/0061; F21Y 2109/00; F21Y 2105/16; G21Y 2107/90
See application file for complete search history.

(56) References Cited

U.S. PATENT DOCUMENTS

| | | | | |
|---|---|---|---|---|
| 2007/0058393 A1* | 3/2007 | Kim | ..................... | G02B 6/0076 362/613 |
| 2014/0098563 A1* | 4/2014 | Kim | ..................... | G02B 6/0076 362/613 |
| 2016/0054506 A1* | 2/2016 | Okimoto | ............. | G02B 6/0068 349/67 |
| 2020/0003404 A1* | 1/2020 | Hikmet | ................ | G02B 6/0001 |

FOREIGN PATENT DOCUMENTS

| | | | | |
|---|---|---|---|---|
| CN | 105487292 A | * | 4/2016 | ........... G02B 6/0035 |
| CN | 109445187 A | | 3/2019 | |
| CN | 212342177 U | | 1/2021 | |
| EP | 3404473 A1 | * | 11/2018 | ........... G02B 6/0031 |

* cited by examiner

*Primary Examiner* — Erin Kryukova
(74) *Attorney, Agent, or Firm* — East IP P.C.

(57) ABSTRACT

The present application discloses a backlight module and a display device. The backlight module includes a plurality of first regions and a plurality of second regions arranged adjacently; the backlight module includes a substrate, including a light-transmitting region, in which the light-transmitting region is at least partially located in the second regions; a plurality of first light-emitting elements, arranged at a side of the substrate, in which the first light-emitting elements are located in the first regions, and the first light-emitting elements emit light along a direction perpendicular to a plane where the substrate is located; a light-guiding plate, arranged at a side of the substrate away from the first light-emitting elements, in which the light-guiding plate includes a plurality of light-supplementing portions located in the second regions; and at least one second light-emitting element, arranged at a side face of the light-guiding plate.

20 Claims, 10 Drawing Sheets

BACKLIGHT MODULE AND DISPLAY DEVICE

CROSS REFERENCE TO RELATED APPLICATION

This application claims priority to Chinese Patent Application No. 202111654597.8, filed Dec. 30, 2021, which is hereby incorporated by reference in its entirety.

TECHNICAL FIELD

The present application relates to the technical field of display technology, and in particular to a backlight module and a display device.

BACKGROUND

In the prior art, a backlight module of the direct-lit display device adopts a millimeter-scale light-emitting diode chip (mini LED). In order to improve the display effect, it is necessary to arrange more and denser mini LEDs, which leads to the high power consumption and the high cost of the display device. In order to reduce the energy consumption and cost of the display device, the mini LEDs are arranged sparsely, that is, the distance between two adjacent LEDs is relatively large. However, this arrangement may easily lead to the problem of "starry sky" of a display panel, that is, the brightness of a region directly facing to the LED is relatively large, and the brightness of a central region formed by four LEDs in any two adjacent rows and two adjacent columns is relatively low; and two regions have obvious uneven brightness and darkness, which affects the light-emitting uniformity of the backlight module.

Therefore, there is an urgent need for a new backlight module and a display device, which can improve the light-emitting uniformity of the backlight module, avoid the problem of "starry sky", and improve the display effect.

SUMMARY

A backlight module and a display device are provided by embodiments of the present application. A light-supplementing portions are located in second regions, and light emitted from the light-supplementing portions can be emitted from a light-transmitting region of a substrate in the second regions to compensate the brightness of the backlight module in the second regions, thereby reducing the difference in the light-emitting brightness of the backlight module between first regions and the second regions, improving the light-emitting uniformity of the backlight module, avoiding the "starry sky" problem, and improving the display effect.

In a first aspect, the embodiments of the present application provides the backlight module, including a plurality of first regions and a plurality of second regions arranged adjacently. The backlight module includes the substrate, including the light-transmitting region, in which the light-transmitting region is at least partially located in the second regions; a plurality of first light-emitting elements, arranged at a side of the substrate, in which the first light-emitting elements are located in the first regions, and the first light-emitting elements emit light along a direction perpendicular to a plane where the substrate is located; a light-guiding plate, arranged at a side of the substrate away from the first light-emitting elements, in which the light-guiding plate includes a plurality of light-supplementing portions located in the second regions; and at least one second light-emitting element, arranged at a side face of the light-guiding plate.

In a second aspect, the embodiments of the present application provides the display device, including the backlight module according to any one of the embodiments as described above, a display panel, arranged at a light-emitting side of the backlight module.

Compared with the related art, the backlight module provided by the embodiments of the present application includes the substrate, the first light-emitting elements, the light-guiding plate and the second light-emitting element. Since the first light-emitting elements are located in the first regions, and the first light-emitting elements emit the light in the direction perpendicular to the plane where the substrate is located, when the backlight module is applied to the display device, the light of the first light-emitting elements is emitted from the first regions to provide backlight for the display panel of the display device. The light-guiding plate is arranged at the side of the substrate away from the first light-emitting elements, and the light-guiding plate can guide the light emitted by the second light-emitting element to the light-supplementing portions for emitting. Since the light-supplementing portions are located in the second regions, and the light emitted from the light-supplementing portions can be emitted from the light-transmitting region of the substrate in the second regions to compensate the brightness of the backlight module in the second regions, thereby reducing the difference in the light-emitting brightness of the backlight module between the first regions and the second regions. In this solution, not only the power consumption can be low, the brightness of the backlight module can meet the requirements, the film assembly can be simple and easy, and the cost can be low, but also the light-emitting uniformity of the backlight module can be fully improved, so as to avoid the problem of "starry sky" and improve the display effect.

BRIEF DESCRIPTION OF THE DRAWINGS

In order to more clearly illustrate the technical solutions of the embodiments of the present disclosure, the drawings to be used in the description of the embodiments of the present disclosure will be described briefly below. Obviously, the drawings in the following description are merely some embodiments of the present disclosure. For those skilled in the art, other drawings can also be obtained according to these drawings without the inventive labor.

DETAILED DESCRIPTION

The features and exemplary embodiments of various aspects of the present application will be described in detail below. In the following detailed description, many specific details are proposed in order to provide a comprehensive understanding of the present application. However, it is obvious to those skilled in the art that the present application can be implemented without some of these specific details. The following description of the embodiments is merely to provide a better understanding of the present application by showing examples of the present application.

It shall be noted that, in this context, relational terms such as first and second are merely used to distinguish one entity or operation from another entity or operation, and do not necessarily require or imply any such actual relationship or order between the entities or operations. Further, the term "comprise", "include" or any other variations thereof is intended to encompass a non-exclusive inclusion, such that a process, method, article, or device including a plurality of elements includes not only these elements but also other elements not listed, or elements that are inherent to such process, method, article or device. Without more limitations, an element that is defined by an expression "comprises . . . " does not exclude other identical elements in the process, method, article, or device comprising this element.

In order to better understand the present application, a backlight module and a display device according to the embodiments of the present application will be described in detail below with reference to FIG. 1 to FIG. 22.

Figure 1:
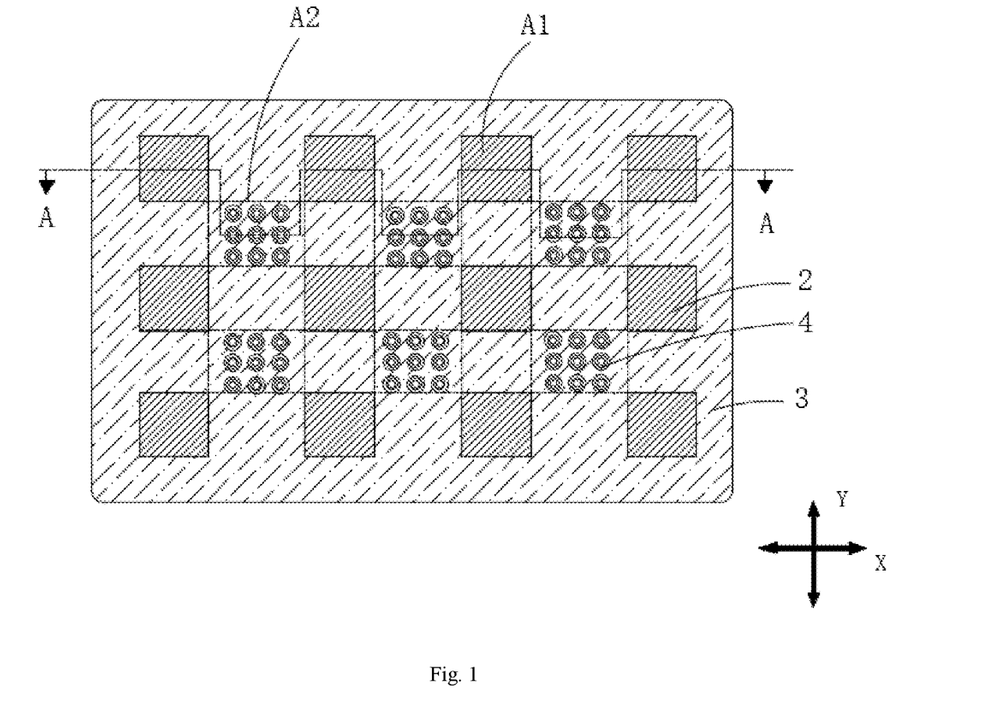
FIG. 1 shows a schematic top view of a backlight module according to an embodiment of the present application.
Figure 2:
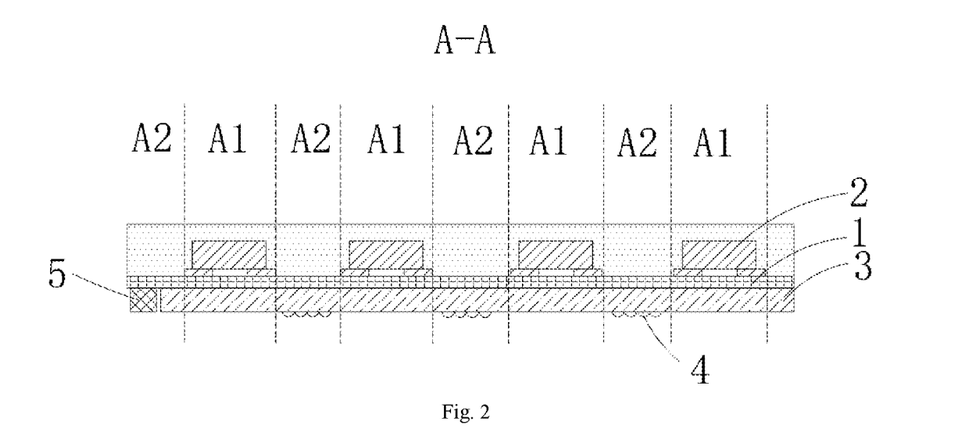
FIG. 2 shows a schematic cross-sectional view at line A-A in FIG. 1 according to an embodiment.

Referring to FIG. 1 to FIG. 2 together, FIG. 1 shows a schematic top view of a backlight module according to the embodiments of the present application; FIG. 2 shows a schematic cross-sectional view at line A-A in FIG. 1 according to the embodiments. The present application provides the backlight module, including a plurality of first regions A1 and a plurality of second regions A2 arranged adjacently. The backlight module includes: a substrate 1, including a light-transmitting region, in which the light-transmitting region is at least partially located in the second regions A2; a plurality of first light-emitting elements 2, arranged at a side of the substrate 1, in which the first light-emitting elements 2 are located in the first regions A1, and the first light-emitting elements 2 emit light along a direction perpendicular to a plane where the substrate 1 is located; a light-guiding plate 3, arranged at a side of the substrate 1 away from the first light-emitting elements 2, in which the light-guiding plate 3 includes a plurality of light-supplementing portions 4 located in the second regions A2; and at least one second light-emitting element 5, arranged at a side face of the light-guiding plate 3.

The backlight module provided by the embodiments of the present application has at least the following beneficial effects:

First, the backlight module provided by the embodiments of the present application only needs to add a small number of the second light-emitting element 5 to supplement the light in the second regions A2, the second regions A2 specifically refers to a central region formed by four first light-emitting elements 2 in any two adjacent rows and two adjacent columns, so that the backlight module does not need to increase the power consumption; secondly, the backlight module provided by the embodiment of the present application does not need a multi-layer optical film to diffuse the light emitted by the first light-emitting elements 2, thereby avoiding the attenuation of the brightness of the backlight module; thirdly, the backlight module provided by the embodiments of the present application includes the substrate 1, the first light-emitting elements 2, the light-guiding plate 3 and the second light-emitting element 5, has no special structure and is relatively easy to assemble; finally, since the first light-emitting elements 2 are located in the first regions A1, and the first light-emitting elements 2 emit the light in the direction perpendicular to the plane where the substrate 1 is located, when the backlight module is applied to the display device, the light of the first light-emitting elements 2 is emitted from the first regions A1 to provide backlight for the display panel of the display device, the light emitted from the first light-emitting elements 2 in the second regions A2 is relatively weak or even absent, so the light-guiding plate 3 is arranged at the side of the substrate 1 away from the first light-emitting elements 2. The light-guiding plate 3 can guide the light emitted by the second light-emitting element 5 to the light-supplementing portions 4 to emit. Since the light-supplementing portions 4 are located in the second regions A2, and the light emitted from the light-supplementing portions 4 can be emitted from the light-transmitting region of the substrate 1 in the second regions A2 to compensate the brightness of the backlight module in the second regions A2, thereby reducing the difference in the light-emitting brightness of the backlight module between the first regions A1 and the second regions A2. In the embodiments of the present application, not only the power consumption can be low, the brightness of the backlight module can meet the requirements, the film assembly can be simple and easy, and the cost can be low, but also the light-emitting uniformity of the backlight module can be fully improved, so as to avoid the problem of "starry sky" and improve the display effect.

In this embodiment, the first light-emitting elements 2 and the second light-emitting element 5 may be a Micro Light Emitting Diode (Micro LED) or a miniature light emitting diode (Mini-LED). The Micro LED and the Mini-LED have the advantages of small size, high light-emitting efficiency and low energy consumption. The size of Micro LED is less than 50 μm, and the size of Mini LED is less than 100 μm.

A LED light-emitting element specifically includes a direct-type light-emitting element and an edge-type light-emitting element. Since the first light-emitting elements 2 need to emit the light in the direction perpendicular to the plane where the substrate 1 is located, the first light-emitting elements 2 usually adopt the direct-type light-emitting element; while the second light-emitting element 5 is arranged at the side face of the light-guiding plate 3, and needs to emit the light in the direction of the side face of the light-guiding plate 3, thus, the second light-emitting element 5 adopt the edge-type light-emitting element.

Figure 5:
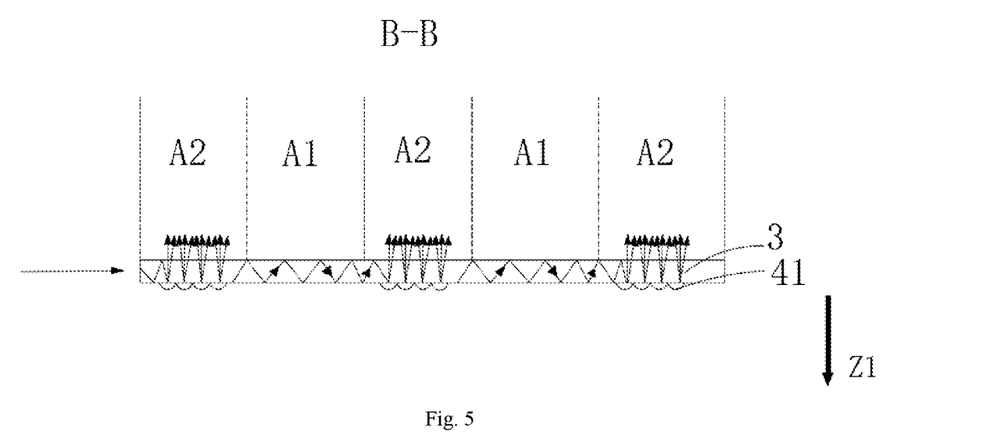
FIG. 5 shows a schematic cross-sectional view at line B-B in FIG. 3 according to an embodiment.

Referring to a light path shown in FIG. 5 for details, it should be noted that, the light-guiding plate 3 uses the principle of total light reflection to convert a line light source of the second light-emitting element 5 into a surface light source, and destroys the total reflection condition of the light-guiding plate 3 by setting the light-supplementing portions 4, so that the light can be concentrated and emitted from the light-supplementing portions 4, so as to improve the brightness of the emitted light. Optionally, the light-guiding plate 3 can be made of a polycarbonate sheet or acrylic material with a high refractive index and no light absorption, which is not particularly limited.

In this embodiment, the light-supplementing portions 4 are only arranged in the second regions A2 because the first light-emitting elements 2 are already arranged in the first regions A1 to emit light. The light-emitting brightness of the first regions A1 is relatively strong, and there is no need to use the light-supplementing portions 4 to supplement the additional light. It is only necessary to arrange the light-supplementing portions 4 in the second regions A2 to improve the light-emitting brightness of the second regions A2 and reduce the difference in the light-emitting brightness between the first regions A1 and the second regions A2.

In order to further improve the light-emitting uniformity of the backlight module, in some optional embodiments, the light-supplementing portions 4 are uniformly distributed in the second regions A2. The second light-emitting element 5 can concentrate and emit the light from a position of the light-supplementing portions 4 through the light-guiding function of the light-guiding plate 3; therefore, the light-supplementing portions 4 are uniformly distributed in the second regions A2, which can improve the light-emitting uniformity of the backlight module.

Figure 3:
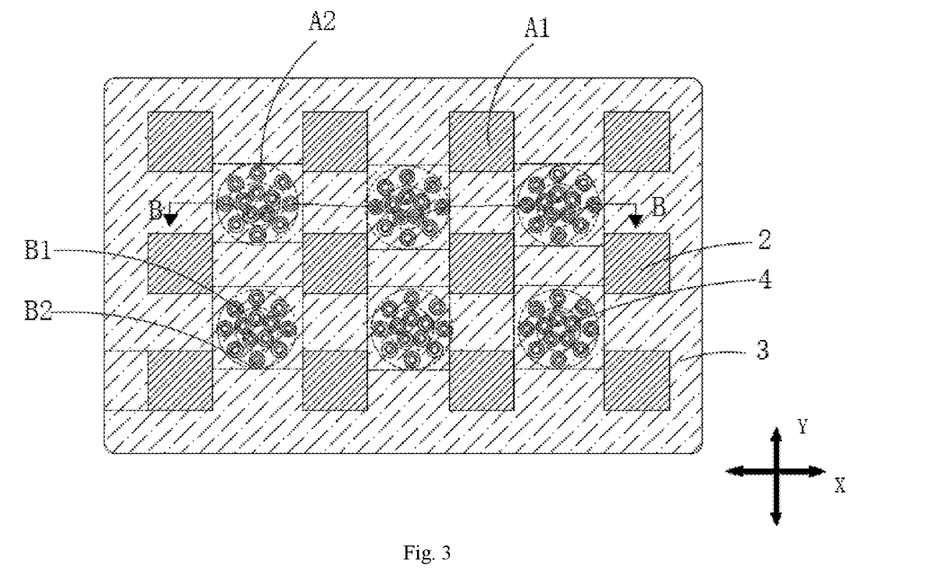
FIG. 3 shows a schematic top view of a light-guiding plate according to an embodiment of the present application.

Since the light emitted by the first light-emitting elements 2 has a certain divergence, the second regions A2 are closer to the first light-emitting elements 2, and the light-emitting brightness is relatively large; the second regions A2 is farther away from the first light-emitting elements 2, and the light-emitting brightness is relatively small, which may affect the light-emitting uniformity of the backlight module. In order to avoid the above problems, please refer to FIG. 3. FIG. 3 shows a schematic top view of the light-guiding plate according to the embodiments of the present application. In some optional embodiments, the light-guiding plate 3 includes a first light-supplementing region B1 and a second light-supplementing region B2, and the first light-supplementing region B1 is arranged away from the first light-emitting elements relative to the second light-supplementing region B2; a distribution density of the light-supplementing portions 4 arranged in the first light-supplementing region B1 is greater than a distribution density of the light-supplementing portions 4 arranged in the second light-supplementing region B2.

The greater the distribution density of the light-supplementing portions 4 in the regions is, the greater the amount of light emitted from the part of the regions is, the greater the light-emitting brightness is; the smaller the distribution density of the light-supplementing portions 4 in the regions is, the smaller the amount of light emitted from the part of the regions is, and the smaller the light-emitting brightness is. Therefore, the distribution density of the light-supplementing portions 4 in the first light-supplementing region B1 and the second light-supplementing region B2 can be adjusted to balance the light-emitting difference due to the difference between a distance between the first light-supplementing region B1 and the first light-emitting elements 2 and a distance between the second light-supplementing region B2 and the first light-emitting elements 2, thereby improving the light-emitting uniformity of the backlight module.

Figure 4:
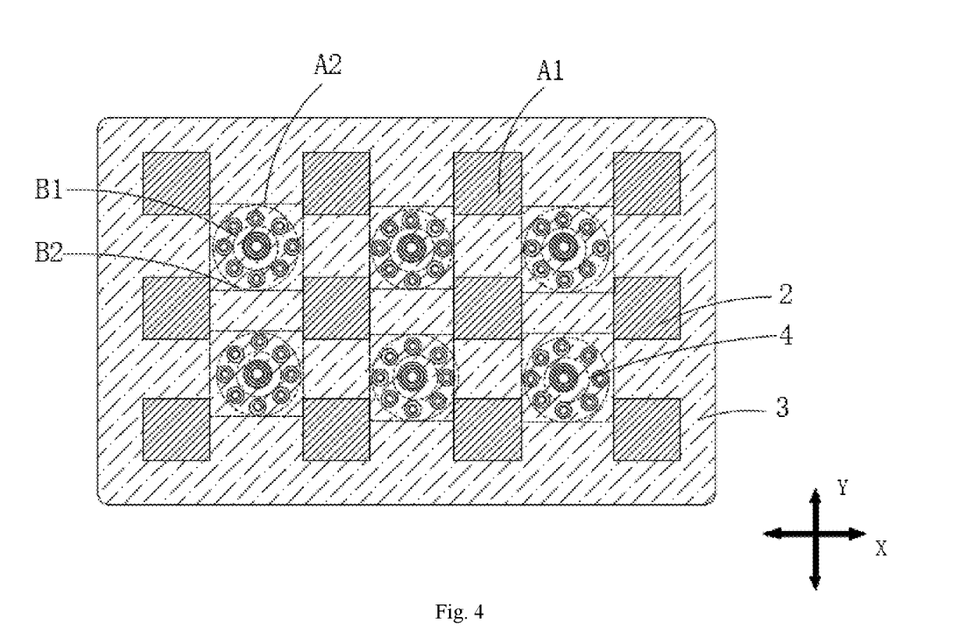
FIG. 4 shows a schematic top view of a light-guiding plate according to another embodiment of the present application.

In addition to adjusting the distribution density of the light-supplementing portions 4, the light-emitting difference due to the difference between the distance between the first light-supplementing region B1 and the first light-emitting elements 2 and the distance between the second light-supplementing region B2 and the first light-emitting elements 2 can also be balanced by other methods. Specifically, referring to FIG. 4, FIG. 4 shows a schematic top view of the light-guiding plate according to another embodiment of the present application. An orthographic projection area of each of the light-supplementing portions 4 arranged in the first light-supplementing region B1 on the substrate 1 is larger than an orthographic projection area of each of the light-supplementing portions 4 arranged in the second light-supplementing region B2 on the substrate 1.

The larger the orthographic projection area of the light-supplementing portions 4 on the substrate 1 is, the larger the light-emitting area of the light-supplementing portions 4 is, the greater the light-emitting brightness is; the smaller the orthographic projection area of the light-supplementing portions 4 on the substrate 1 is, the smaller the light-emitting area of light-supplementing portions 4 is, the smaller the light-emitting brightness is. Therefore, the light-emitting difference due to the difference between the distance between the first light-supplementing region B1 and the first light-emitting elements 2 and the distance between the second light-supplementing region B2 and the first light-emitting elements 2 can also be balanced by the orthographic projection area of the light-supplementing portions 4 in the first light-supplementing region B1 and second light-supplementing region B2 on the substrate 1, thereby improving the light-emitting uniformity of the backlight module. Certainly, other methods may also be used to balance the light-emitting difference due to the difference between the distance between the first light-supplementing region B1 and the first light-emitting elements 2 and the distance between the second light-supplementing region B2 and the first light-emitting elements 2, which is not particularly limited.

In order to let the light of the second light-emitting element 5 be concentrated and emitted from the light-supplementing portions 4, please refer to FIG. 5. FIG. 5 shows a schematic cross-sectional view at line B-B in FIG. 3 according to the embodiments. In some optional embodiments, each of the light-supplementing portions 4 includes a protruding portion 41 arranged at a side of the light-guiding plate 3 away from the substrate 1, and in a direction Z1 from the substrate 1 to the light-guiding plate 3, a cross-sectional area of the protruding portion 41 gradually decreases.

It should be noted that the light emitted from the second light-emitting element 5 enters into the light-guiding plate 3 from the side face of the light-guiding plate 3, and emits in the direction toward the substrate 1 under the reflection of the protruding portion 41. Referring to the light path shown in FIG. 5, by arranging the protruding portion 41 in a form in which the cross-sectional area of the protruding portion gradually decreases in the direction Z1 from the substrate 1 to the light-guiding plate 3, the light can be reflected in different directions in the protruding portion 41, so as to increase the irradiating range of the light emitted by the light-supplementing portions 4.

Optionally, the protruding portion 41 is in a shape of hemisphere, and a radius of a projection of the protruding portion 41 in a direction perpendicular to the backlight module is 5 μm to 10 μm. It should be noted that the radius of the projection of the protruding portion 41 in the direction perpendicular to the backlight module should not be too large; if it is too large, it will be inconvenient to be arranged and affect an entire thickness of the backlight module. While the radius of the projection of the protruding portion 41 should not be too small; if it is too small, the light-emitting amount of the protruding portion 41 will be insufficient. Specifically, the radius of the projection of the protruding portion 41 in the direction perpendicular to the backlight module may be 8 μm.

Figure 6:
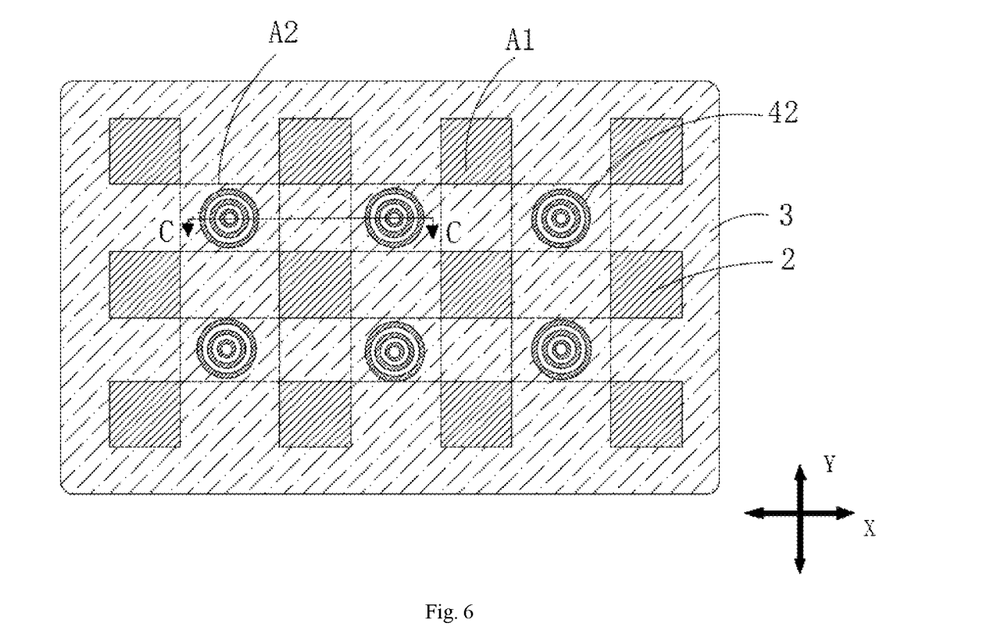
FIG. 6 shows a schematic top view of a light-guiding plate according to another embodiment of the present application.
Figure 7:
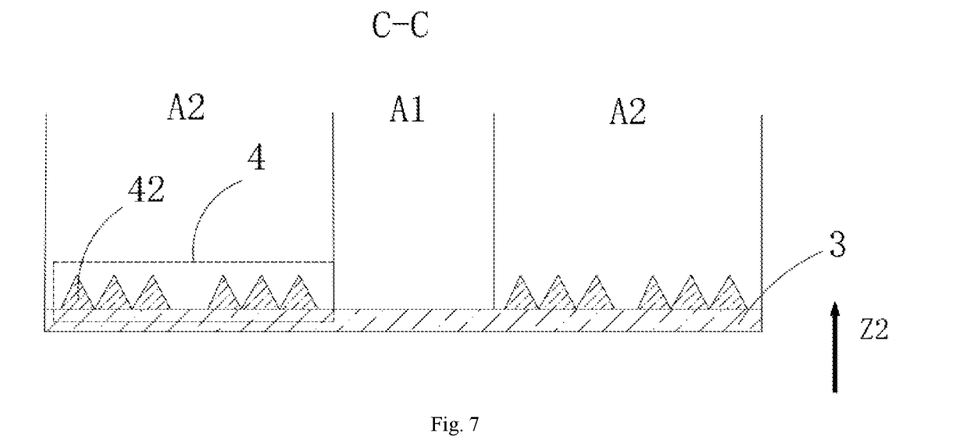
FIG. 7 shows a schematic cross-sectional view at line C-C in FIG. 6 according to an embodiment.
Figure 8:
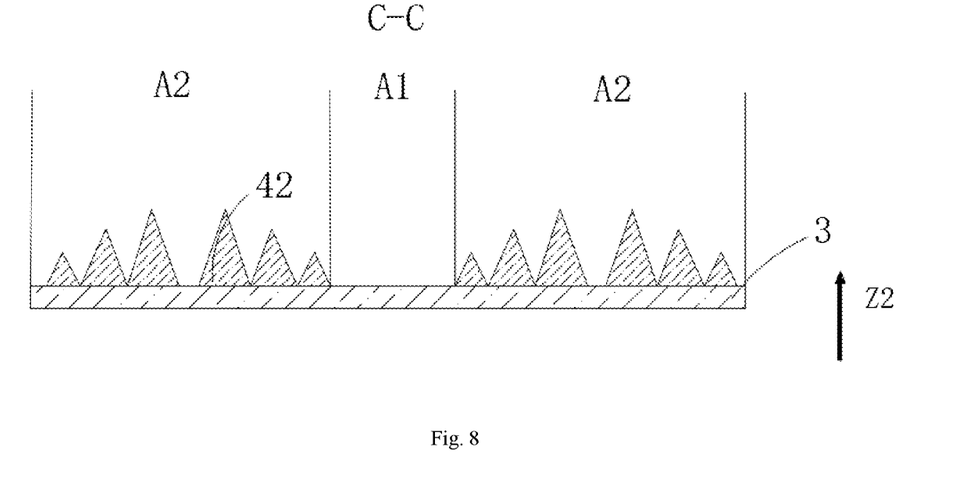
FIG. 8 shows a schematic cross-sectional view at line C-C in FIG. 6 according to another embodiment.
Figure 9:
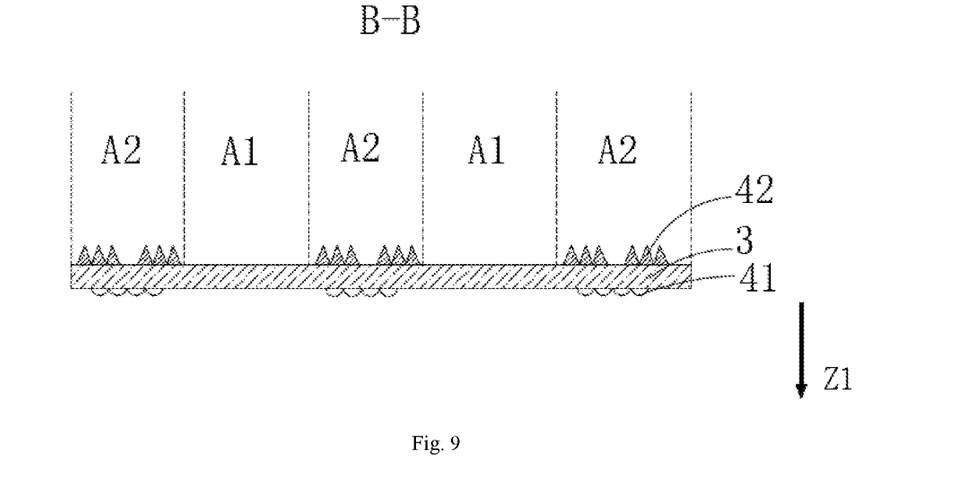
FIG. 9 shows a schematic cross-sectional view at line B-B in FIG. 3 according to another embodiment.

Referring to FIG. 6 to FIG. 9, FIG. 6 shows a schematic top view of the light-guiding plate according to another embodiment of the present application; FIG. 7 shows a schematic cross-sectional view at line C-C in FIG. 6 according to an embodiment; FIG. 8 shows a schematic cross-sectional view at line C-C in FIG. 6 according to another embodiment; FIG. 9 shows a schematic cross-sectional view at line B-B in FIG. 3 according to another embodiment. In some other optional embodiments, each of the light-supplementing portions 4 includes a plurality of light-guiding strips 42 arranged adjacently, and in a direction Z2 from the light-guiding plate 3 to the substrate 1, a cross-sectional area of each of the light-guiding strips 42 gradually decreases.

In this embodiment, after the light emitted from the second light-emitting element 5 enters into the light-guiding plate 3 from the side face of the light-guiding plate, the light reflected in the light-guiding plate 3 is collected by the light-guiding strips 42. In the direction Z2 from the light-guiding plate 3 toward the substrate 1, cross sections can be obtained along an extending direction of the light-guiding strips 42, and shapes of the cross-sections of the light-guiding strips 42 may be gradually low from the middle to the two sides. When the light entering the light-guiding strips 42 emits from the light-guiding strips 42 and enters into an air layer, the light will converge in the middle of the light-guiding strips 42. In other words, the light-guiding strips 42 can collect the light entering at a large angle perpendicular to the extending direction of the light-guiding strips, and convert the light into the light emitting at a small angle. In the direction Z2 from the light-guiding plate 3 to the substrate 1, the cross-sectional area of the light-guiding strips 42 is gradually reduced, so that the light can be concentrated and emitted from ends of the light-guiding strips 42 close to the substrate 1, which also can improve the light-emitting brightness. As shown in FIG. 7, sizes of the light-guiding strips 42 in the direction Z2 of the light-guiding plate 3 toward the substrate 1 may be arranged uniformly, or may be arranged gradually according to the distance between the light-guiding strips 42 and the first regions A1, that is, the farther a distance from the light-guiding strips 42 to the first regions A1 is, the larger the size of the light-guiding strips 42 in the direction Z2 of the light-guiding plate 3 toward the substrate 1 is, so as to adjust the light-emitting amount, as shown in FIG. 8.

As shown in FIG. 9, the protruding portion 41 and the light-guiding strips 42 can be arranged on the light-guiding plate 3 at the same time, which can further improve the light-emitting brightness of the second regions A2. Certainly, only one of the protruding portion 41 and the light-guiding bar 42 may be arranged, which is not particularly limited.

Figure 10:
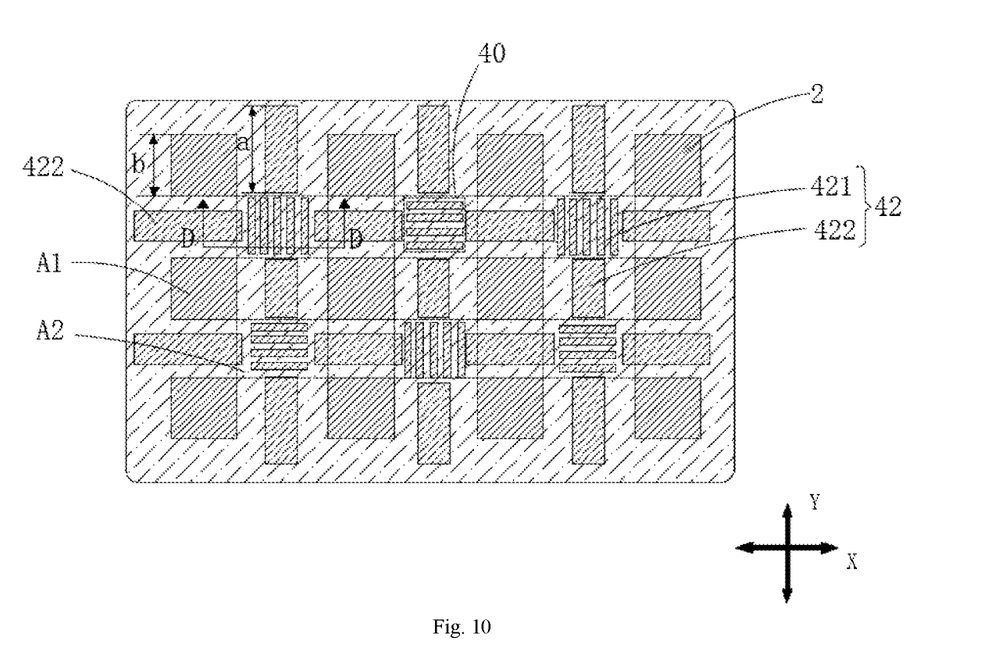
FIG. 10 shows a schematic top view of a light-guiding plate according to another embodiment of the present application.
Figure 11:
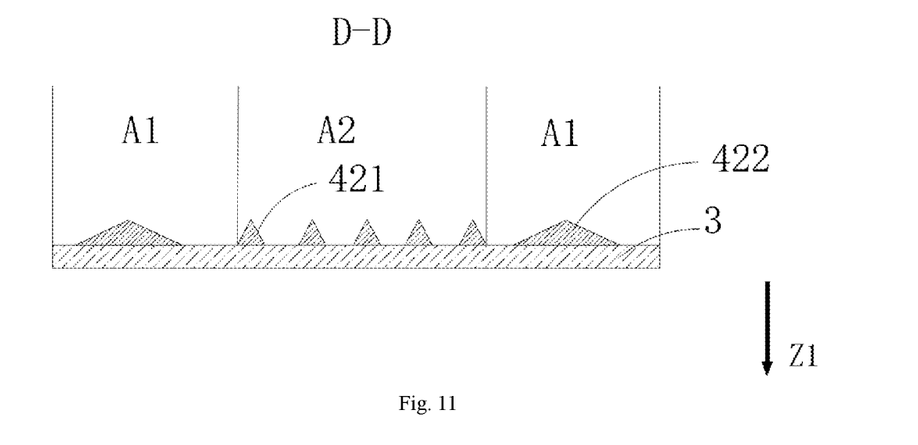
FIG. 11 shows a schematic cross-sectional view at line D-D in FIG. 10 according to an embodiment.
Figure 12:
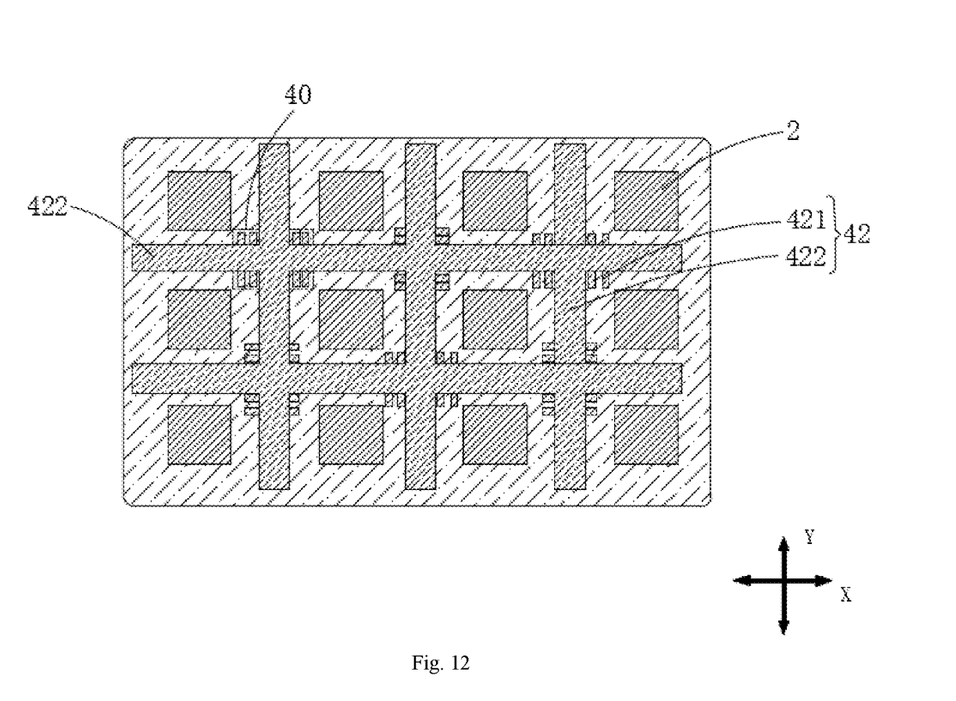
FIG. 12 shows a schematic top view of a light-guiding plate according to another embodiment of the present application.
Figure 13:
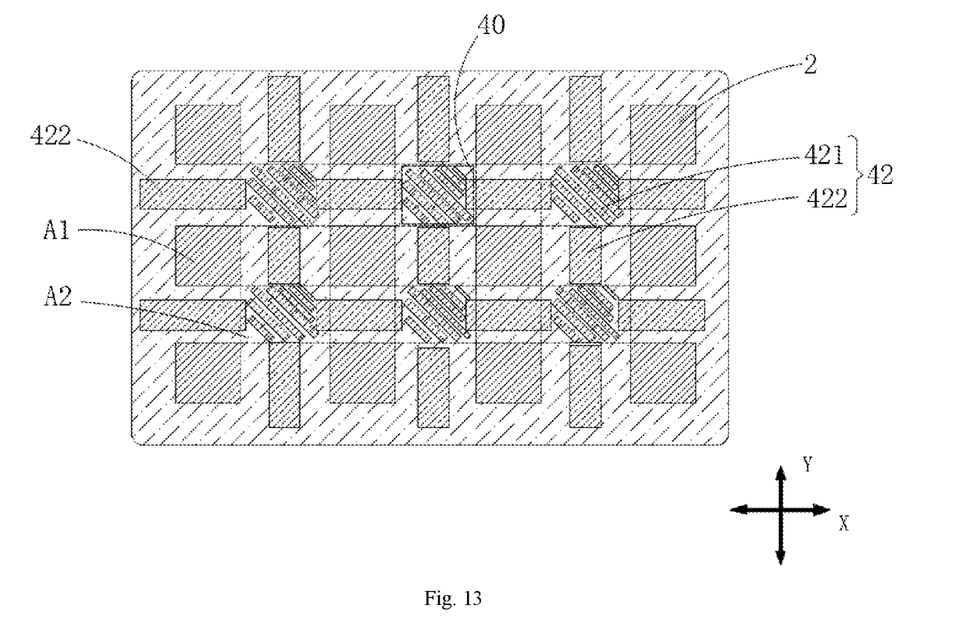
FIG. 13 shows a schematic top view of a light-guiding plate according to another embodiment of the present application.

Referring to FIG. 10 to FIG. 13, FIG. 10 shows a schematic top view of the light-guiding plate according to another embodiment of the present application; FIG. 11 shows a schematic cross-sectional view at line D-D in FIG. 10 according to the embodiments; FIG. 12 shows a schematic top view of the light-guiding plate according to another embodiment of the present application; FIG. 13 shows a schematic top view of the light-guiding plate according to another embodiment of the present application. In some optional embodiments, the light-guiding strips 42 include first light-guiding strips 421 and second light-guiding strips 422 arranged apart from each other, at least two first light-guiding strips 421 with a same extending direction form a light-guiding strip group 40, the second light-guiding strips 422 extend along an arrangement direction of the first light-emitting elements 2, and a orthographic projection of the second light-guiding strips 422 on the substrate 1 is at least partially located between orthographic projections of the two adjacent first light-emitting elements 2 on the substrate 1.

In this embodiment, the light-guiding strip group 40 can be arranged in the central region surrounded by several first light-emitting elements 2 in any two adjacent rows and any two adjacent columns, that is, the second regions A2. The light emitted from the first light-emitting elements 2 in the second regions A2 is relatively weak or even absent. The light-guiding strip group 40 is formed by at least two first light-guiding strips 421 with the same extending direction to collect light in the same direction and improve the light-emitting brightness. The extending direction of the first light-guiding strips 421 is not particularly limited, and can be arranged horizontally, vertically or obliquely (as shown in FIG. 13) to collect light in different directions.

The second light-guiding strips 422 extend along an arrangement direction of the first light-emitting elements 2. For example, the first light-emitting elements 2 are respectively arranged along the first direction X and the second direction Y, the first direction X intersects the second direction Y, a part of the second light-guiding strips 422 extend along the first direction X, and another part of the second light-guiding strips 422 extend along the second direction Y. The orthographic projection of the second light-guiding strips 422 on the substrate 1 is at least partially located between the orthographic projections of the two adjacent first light-emitting elements 2 on the substrate 1, so that the brightness of a region between the adjacent first light-emitting elements 2 can be compensated by the second light-guiding strips 422. Optionally, as shown in FIG. 10, in order to avoid mutual influence, the second light-guiding strips 422 are arranged apart from the light-guiding strip group 40 formed by the first light-guiding strips 421. Alternatively, as shown in FIG. 12, the second light-guiding strips 422 are arranged through the first light-guiding strips 421. In this embodiment, since the first light-emitting elements 2 are arranged along the first direction X and the second direction Y respectively, in the case that the first direction X is perpendicular to the second direction Y, that is, the first light-emitting elements 2 are arranged horizontally and vertically, in order to engage the arrangement of the first light-emitting elements 2 to better compensate the brightness of the region between adjacent first light-emitting elements 2, optionally, the second light-guiding strips 422 may be in the shape of elongated strip, such as rectangle.

As shown in FIG. 10, in some optional embodiments, a length a of each of the second light-guiding strips 422 in a extending direction of itself is greater than or equal to any one of a length of each of the first light-emitting elements 2 in a first direction X and a length b of each of the first light-emitting elements in the second direction Y. Specifically, in the first direction X or the second direction Y, one second light-guiding strip 422 can span a plurality of groups of adjacent first light-emitting elements 2; for example, in the first direction X, a whole strip of second light-guiding strip 422 may be arranged on the light-guiding plate 3, and located between two adjacent rows of the first light-emitting elements 2 in the first direction X. By making the length a of each of the second light-guiding strips 422 in the extending direction of itself greater than or equal to any one of the length of the first light-emitting elements 2 in the first direction X and the length b of the first light-emitting elements in the second direction Y, the second light-guiding strips 422 can further improve the light-emitting brightness in the region between the adjacent first light-emitting elements 2.

Optionally, a width of each of the second light-guiding strips 422 in the extending direction of itself can be selectively adjusted according to the brightness difference between the center of the first light-emitting elements 2 and two adjacent first light-emitting elements 2; the number of second light-guiding strips 422 can also be selectively adjusted according to the brightness difference between the center of the first light-emitting elements 2 and two adjacent first light-emitting elements 2.

Continually referring to FIG. 10 and FIG. 12, in order to collect the light in different directions, in some optional embodiments, the light-guiding strips 42 include the first light-guiding strips 421, at least two first light-guiding strips 421 with the same extending direction form the light-guiding strip group 40, and extending directions of the first light-guiding strips 421 of two adjacent light-guiding strip groups 40 are different.

By arranging the extending directions of the first light-guiding strips 421 of the two adjacent light-guiding strip groups 40 to be different, the light in different directions can be collected, and the uniformity of light output can be improved. In some embodiments, the extending directions of the first light-guiding strips 421 of two adjacent light-guiding strip groups 40 are perpendicular to collect light in different directions to the greatest extent. Specifically, the light-guiding strips 42 are used to collect light with a larger incident angle (i.e. a larger inclination angle) in the direction perpendicular to the extending direction of the light-guiding strips 42, and the collected light is concentrated and emitted from the ends of the light-guiding strips 42 close to the substrate 1, which can improve the light-emitting brightness. As shown in FIG. 10 and FIG. 12, two adjacent light-guiding strip groups 40 extend along the first direction X and the second direction Y respectively.

As shown in FIG. 8 and FIG. 9, in some optional embodiments, in the plane perpendicular to the plane where the substrate 1 is located, cross sections of the light-guiding strips 42 are in a shape of at least one of triangle, trapezoid (not shown) and semicircle (not shown).

The light-guiding strips 42 need to be used to collect the light, therefore, the cross sections of the light-guiding strips 42 may be in a shape of triangle, isosceles trapezoid, semicircle or other similar shapes with a thicker thickness in the center and thinner thickness on both sides, and are not particularly limited.

In some optional embodiments, orthographic projections of the plurality of the light-guiding strips 42 on the substrate 1 are in shapes of concentric rings; or orthographic projections of the light-guiding strips 42 on the substrate 1 are in a shape of rectangle.

Figure 14:
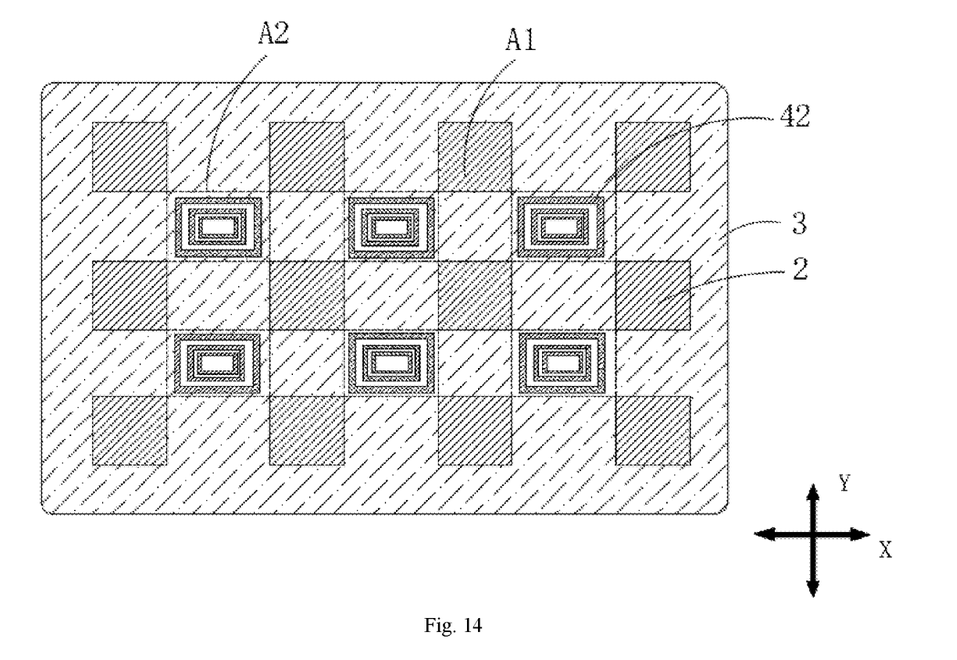
FIG. 14 shows a schematic top view of a light-guiding plate according to another embodiment of the present application.

The concentric rings may specifically be concentric circle rings, as shown in FIG. 6, or may be concentric rings formed by a plurality of regular polygons, as shown in FIG. 14. FIG. 14 shows a schematic top view of the light-guiding plate according to another embodiment of the present application, which is not particularly limited. The radius or length of the concentric rings or the length and the width of the rectangle of each of the light-guiding strips 42 may be the same or different; for example, when the orthographic projections of the plurality of light-guiding strips 42 on the substrate 1 are in shapes of concentric rings, the number of the concentric rings can be arranged according to the distance from the first light-emitting elements 2; for example, the farther the distance from the first light-emitting elements 2 is, the greater the number of concentric rings is and the greater the light-emitting amount is, and the closer the distance from the first light-emitting elements 2 is, the less the number of concentric rings is and the less the light-emitting amount is, so as to balance the light-emitting difference caused by the distance difference between the light-guiding strips 42 and the first light-emitting elements 2.

When the orthographic projections of the light-guiding strips 42 on the substrate 1 are in shapes of rectangle, the light output can also be adjusted by adjusting the width of the rectangular light-guiding strips 42, so as to balance the light-emitting difference caused by the distance difference between the light-guiding strips 42 and the first light-emitting elements 2. Certainly, the shape of the orthographic projections of the light-guiding strips 42 on the substrate 1 is not limited to the above embodiment, and can be arranged according to actual needs.

Since the light emitted from the light-guiding plate 3 needs to pass through the substrate 1 and then be emitted to the display panel, at least a part of the substrate 1 needs to be able to transmit light, which is the light-transmitting region of the substrate 1. In some optional embodiments, the entire substrate 1 can transmit the light. Specifically, the substrate 1 is a transparent substrate with a light transmittance greater than 50%. The transparent substrate with the light transmittance greater than 50% can effectively ensure that the transparent substrate has sufficient light-emitting amount, can effectively enhance the luminous intensity of the backlight module in the second regions A2, so as to reduce the difference of the light-emitting brightness of the backlight module between the first regions A1 and the second regions A2. Optionally, the substrate 1 may be a transparent substrate with the light transmittance greater than 80%.

Since the thickness of the substrate 1 will affect the light transmittance of the substrate 1, if the thickness of the substrate 1 is too large, the light-emitting amount from the substrate 1 may not meet the requirements. In some optional embodiments, the substrate 1 is a polyimide substrate or a glass substrate, and the thickness of the substrate 1 is less than or equal to 30 μm.

Specifically, the polyimide substrate is the transparent substrate, and the polyimide substrate having the thickness of 20 μm can be used. When the substrate 1 is a glass substrate, it needs to be prepared by using an ultra-thin glass, so that the thickness of the substrate can meet the requirements. Specifically, the thickness of the glass substrate can also be 20 μm.

Since the first light-emitting elements 2 are located in the first regions A1, which means the light-emitting amount and the brightness of the backlight module in the first regions A1 can meet the requirements, and there is no need to supplement the additional light, thus, in some optional embodiments, the light transmittance of the part of the substrate 1 located in the first regions A1 is lower than the light transmittance of the part of the substrate 1 located in the second regions A2.

In this embodiment, the light transmittance of the part of the substrate 1 located in the first regions A1 is lower than the light transmittance of the part of the substrate 1 located in the second regions A2, which can ensure that more light emitted from the light-guiding plate 3 can transmit through the part of the substrate 1 in the second regions A2; and the light can transmit less or even cannot transmit at all from the part of the substrate 1 located in the first regions A1, which can further reduce the difference of the light-emitting brightness of the backlight module between the first regions A1 and the second regions A2.

Figure 15:
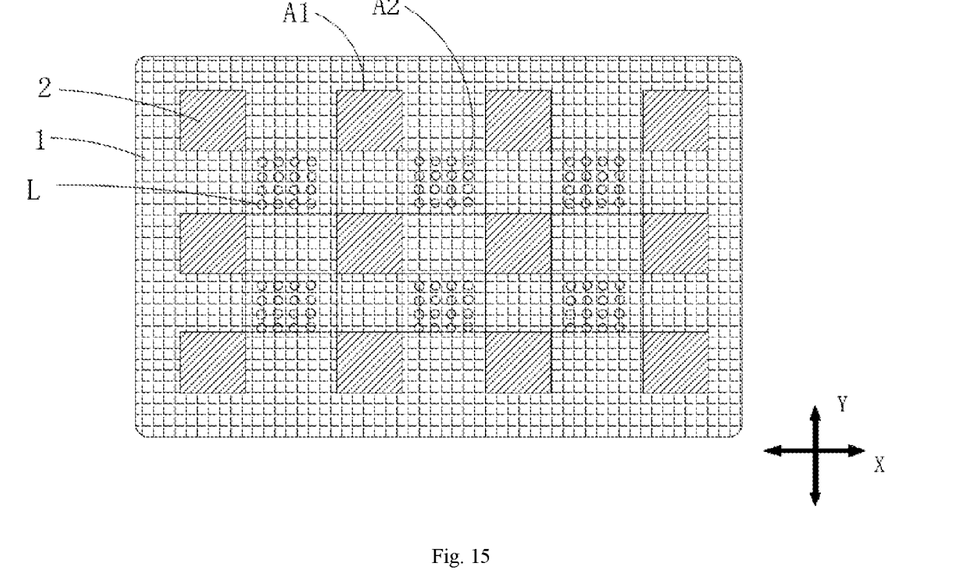
FIG. 15 shows a schematic top view of a substrate according to an embodiment of the present application.

Referring to FIG. 15, FIG. 15 shows a schematic top view of the substrate according to the embodiments of the present application. In order to improve the light transmittance of part of the substrate 1 located in the second regions A2, in some optional embodiments, a part of the substrate 1 located in the second regions A2 is provided with hollow holes L. It can be understood that the light transmittance of the substrate 1 can be adjusted by adjusting the number and size of the hollow holes L, and the number of the hollow holes L formed on the substrate 1 can be determined according to the material, the thickness of the substrate 1 and the aperture size of the hollow holes L, as long as the structural strength of the substrate 1 is not affected and the service life of the substrate 1 is not affected. Optionally, the hollow holes L may be in a shape of rectangle, circle, circle annular or the like, which is not particularly limited.

Figure 16:
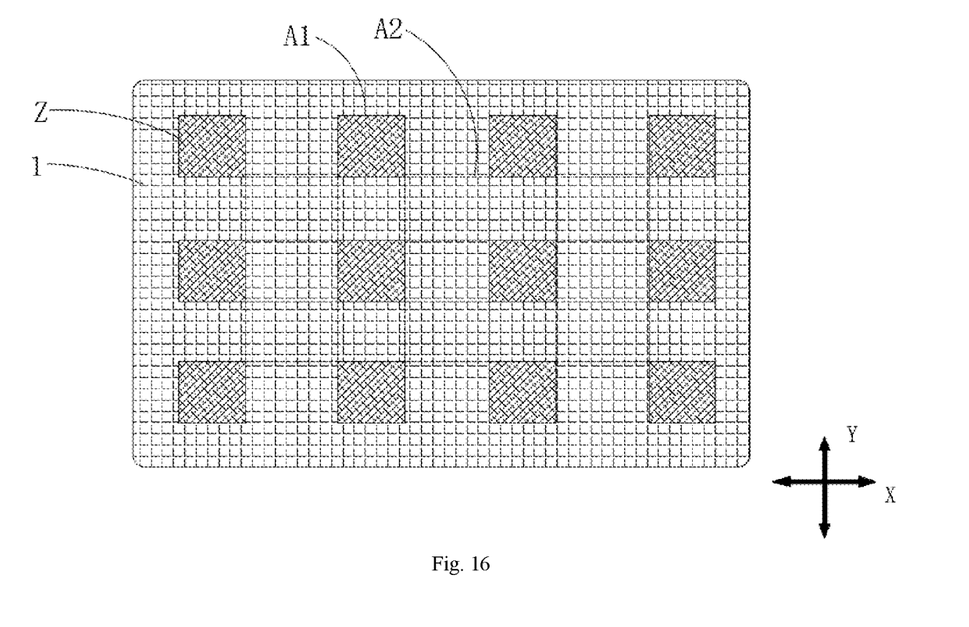
FIG. 16 shows a schematic top view of a substrate according to another embodiment of the present application.

Referring to FIG. 16, FIG. 16 shows a schematic top view of the substrate according to another embodiment of the present application. In order to make the light transmittance of the part of the substrate 1 located in the first regions A1 smaller than the light transmittance of the part of the substrate 1 located in the second regions A2, in some optional embodiments, a light-shielding layer Z is arranged at a side of the part of the substrate 1 located in the first regions A1 facing the light-guiding plate 3.

The light-shielding layer Z can effectively block the light from passing through the substrate 1. The light shielding layer Z is arranged at a side of the part of the substrate 1 located in the first regions A1 facing the light-guiding plate 3, so as to block the light from emitting from the part of the substrate 1 located in the first regions A1, and the light-shielding layer Z is not arranged on the part of the substrate 1 in the second regions A2, so that the light transmittance of the part of the substrate 1 located in the first regions A1 is lower than the light transmittance of the part of the substrate 1 located in the second regions A2. In this embodiment, the light shielding layer Z may be a material that is opaque or has low light transmittance, such as black ink. Optionally, the light-shielding layer Z may also be arranged at a side of the part of the substrate 1 located in the first regions A1 away from the light-guiding plate 3, or the light-shielding layer Z may also be arranged at both sides of the part of the substrate 1 located in the first regions A1 at the same time, so as to further improve the light-shielding effect.

Figure 17:
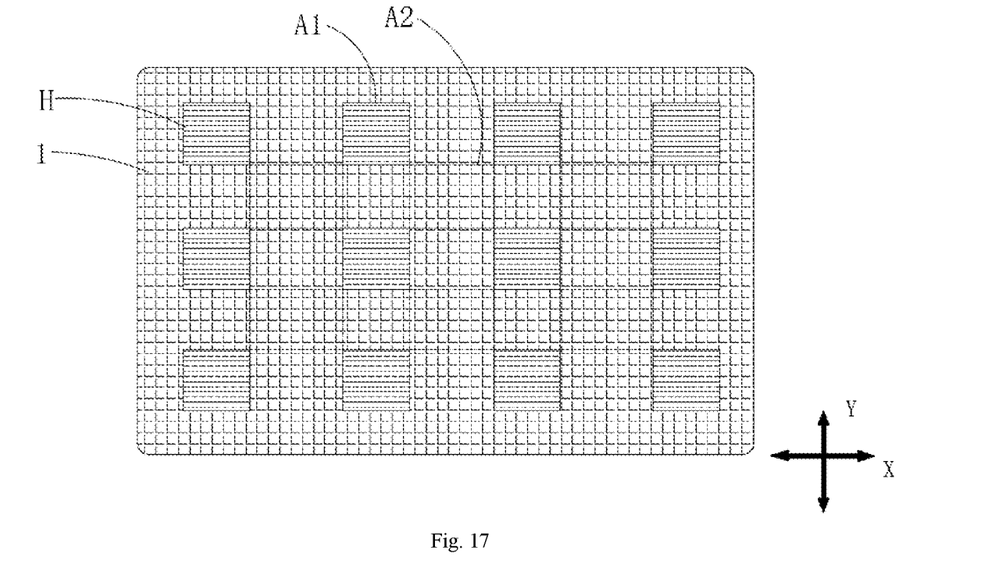
FIG. 17 shows a schematic top view of a substrate according to another embodiment of the present application.

Referring to FIG. 17, FIG. 17 shows a schematic top view of the substrate according to another embodiment of the present application. In order to be fixed and electrically connected to the first light-emitting elements 2, in some optional embodiments, the substrate 1 includes a welding pad at least partially electrically connected to the first light-emitting elements 2, and an orthographic projection of the welding pad H on the light-guiding plate 3 covers an orthographic projection of each of the first light-emitting elements 2 on the light-guiding plate 3.

It should be noted that the welding pad H is usually made of metal solder, which may be a single metal, such as indium (In), tin (Sn), copper (Cu) or the like, or may be an alloy solder, such as In/Sn alloy, In/Sn/Bi alloy or the like; thus, the welding pad H is opaque, so the light can be effectively blocked by the welding pad H. In this embodiment, the orthographic projection of the welding pad H on the light-guiding plate 3 covers the orthographic projection of each of the first light-emitting elements 2 on the light-guiding plate 3, thereby blocking the light emitted from the light-guiding plate 3 from further emitting to the location of the first light-emitting elements, so that it can avoid further enhancing the brightness of the backlight module at the location corresponding to the first light-emitting elements 2, and reduce the difference of the light-emitting brightness of the backlight module between the first regions A1 and the second regions A2.

Figure 18:
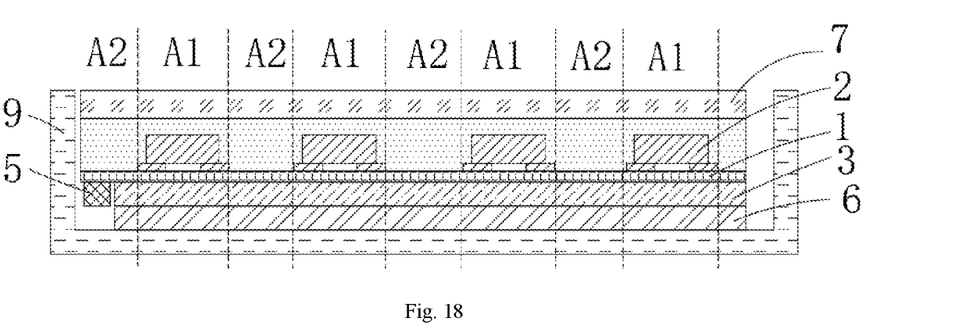
FIG. 18 shows a schematic cross-sectional view of a backlight module according to an embodiment.

Referring to FIG. 18, FIG. 18 shows a schematic cross-sectional view of the backlight module according to the embodiments. In order to realize the driving and signal control of the second light-emitting element 5, in some optional embodiments, the second light-emitting element 5 is fixed at the side of the substrate 1 away from the first light-emitting elements 2, and the second light-emitting element 5 is electrically connected to the substrate 1.

In this embodiment, the second light-emitting element 5 and the first light-emitting elements 2 are respectively arranged at both sides of the same substrate 1, and share the same substrate 1, which means the substrate 1 realizes double-sided printing through the double-layer wiring; components electrically connected to the first light-emitting elements 2 and the second light-emitting element 5 are respectively formed at both sides of the substrate 1 to realize driving control of the first light-emitting elements 2 and the second light-emitting element 5. By sharing the same substrate 1 for the first light-emitting elements 2 and the second light-emitting element 5, the production cost can be effectively reduced. Specifically, the first light-emitting elements 2 and the second light-emitting element 5 may be fixed on the substrate 1 by welding, conductive adhesive bonding or the like.

Figure 19:
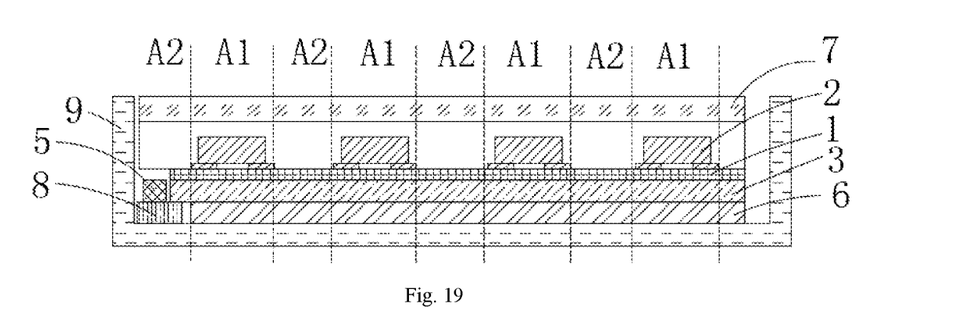
FIG. 19 shows a schematic cross-sectional view of a backlight module according to another embodiment.

In addition to the embodiment that the first light-emitting elements 2 and the second light-emitting element 5 share the same substrate 1, the second light-emitting element 5 can also be separately arranged for driving control, so as to adjust a arrangement position of the second light-emitting element 5 and the light-emitting brightness. Specifically, referring to FIG. 19, FIG. 19 shows a schematic cross-sectional view of the backlight module according to another embodiment. The backlight module further includes a driving circuit board 8, the driving circuit board 8 is arranged at the side of the substrate 1 away from the first light-emitting elements 2, and the second light-emitting element 5 is fixed and electrically connected to the driving circuit board 8.

In this embodiment, the driving circuit board 8 can be additionally arranged to fix and electrically connect the second light-emitting element 5 to the driving circuit board 8. Specifically, the driving circuit board 8 may be a Flexible Printed Circuit (FPC), made of polyimide or polyester film as the base material, and has the characteristics of high wiring density, light weight, thin thickness and good bendability. The driving circuit board 8 can be separately arranged to drive the second light-emitting element 5, which can facilitate the control of the second light-emitting element 5, and avoid the signal interference between the second light-emitting element 5 and the first light-emitting elements 2, and improve the reliability of the backlight module.

Figure 20:
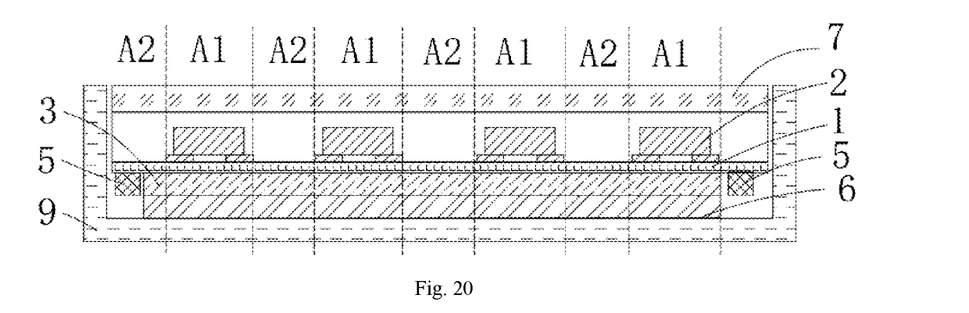
FIG. 20 shows a schematic cross-sectional view of a backlight module according to another embodiment.

Referring to FIG. 20, FIG. 20 shows a schematic cross-sectional view of the backlight module according to another embodiment. In order to improve the light-emitting amount of the light-guiding plate 3, in some optional embodiments, at least two second light-emitting elements 5 are arranged at the side face of the light-guiding plate 3, and the second light-emitting elements 5 are symmetrical with respect to a center of the light-guiding plate 3.

The light-emitting amount and light-emitting brightness of the light-guiding plate 3 are proportional to the number of the second light-emitting elements 5. The greater the number of the second light-emitting elements 5 is, the greater the light-emitting amount and the light-emitting brightness of the light-guiding plate 3 is. However, if the number of the second light-emitting elements 5 is too large, the size of the backlight module will be too large. Optionally, two second light-emitting elements 5 are symmetrically arranged at the side of the light-guiding plate 3 with respect to the center of the light-guiding plate 3, so as to improve the uniformity of the light entering from both sides of the light-guiding plate 3. Certainly, other numbers of second light-emitting elements 5 may also be arranged, such as a string of light strip on the left and right sides or the like, which are not particularly limited.

Figure 21:
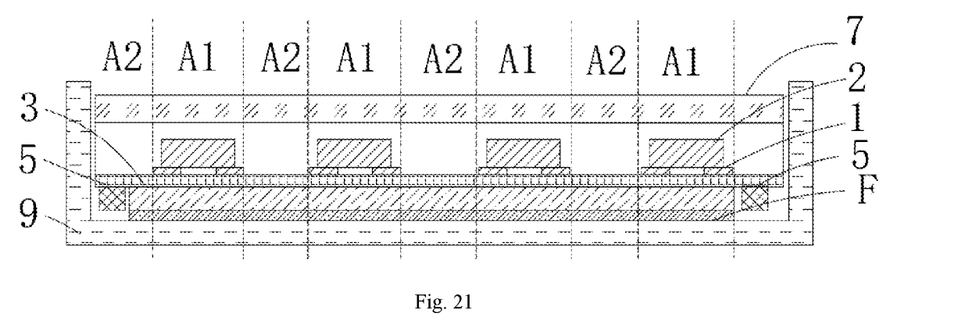
FIG. 21 shows a schematic cross-sectional view of a backlight module according to another embodiment.

Referring to FIG. 21, FIG. 21 shows a schematic cross-sectional view of the backlight module according to another embodiment. In order to improve the utilization rate of the light of the second light-emitting element 5 entering the light-guiding plate 3 and prevent the light from emitting from the side of the light-guiding plate 3 away from the substrate 1, in some optional embodiments, a reflecting coating layer F is arranged on at least a surface of a part of the light-guiding plate 3 located in the second regions A2 at a side away from the first light-emitting elements 2.

In this embodiment, by spraying the reflecting coating layer F on the light-guiding plate 3, the light in the light-guiding plate 3 can be reflected toward the side of the substrate 1, and the light-emitting amount of the light-guiding plate 3 located in the second regions A2 can be improved, so that the light-supplementing effect of the backlight module in the second regions A2 can be improved. Specifically, the reflecting coating layer F can be made of a polymer material with a high refractive index. In addition, the thickness of the reflecting coating layer F formed by spraying is relatively small, so that it can ensure that the thickness of the reflecting coating layer F is below 0.1 mm, so as to effectively reduce the entire thickness of the backlight module.

Referring to FIG. 19, in some other optional embodiments, a reflecting sheet 6 is arranged on a surface of the light-guiding plate 3 at a side away from the first light-emitting elements 2, and the driving circuit board 8 and the reflecting sheet 6 are arranged in a same layer.

The size and the shape of the reflecting sheet 6 can be the same as the size and the shape of the light-guiding plate 3, so that the flatness of the light-guiding plate 3 can be ensured when the reflecting sheet 6 is arranged under the light-guiding plate 3. Optionally, the driving circuit board 8 and the reflecting sheet 6 are arranged on the same layer, and the second light-emitting element 5 and the light-guiding plate 3 are arranged on the same layer, so as to improve the space utilization rate of the backlight module and reduce the entire thickness of the backlight module.

In the related art, since there is no additional second light-emitting element 5 to supplement light, a multi-layer beam splitter and an upper-and-lower light-enhancing sheet are usually arranged at the side of the first light-emitting elements 2 away from the substrate 1, and the thickness of this part of the structure is 0.7 mm to 0.9 mm, thus, the thickness is relatively large, which is not conducive to reducing the entire thickness of the backlight module. In the embodiments of the present application, it is not necessary to provide the multi-layer beam splitter or the upper-and-lower light-enhancing sheet. In some optional embodiments, in the direction perpendicular to the plane where the substrate 1 is located, a sum of a thickness of the reflecting sheet 6 and a thickness of the light-guiding plate 3 may be 0.4 mm to 0.6 mm.

Compared with the related art, the embodiments of the present application is additionally provided with the reflecting sheet 6 and the light-guiding plate 3, but the sum of the thickness of the reflecting sheet 6 and the thickness of the light-guiding plate 3 may be 0.4 mm to 0.6 mm, which is less than the thickness of the multi-layer beam splitter and the upper-and-lower light-enhancing sheet which are removed, thereby reducing the entire thickness of the backlight module.

In some optional embodiments, the backlight module further includes a diffusing layer 7. The diffusing layer 7 is arranged on a surface of the first light-emitting elements 2 at a side away from the substrate 1.

In this embodiments, by arranging the diffusing layer 7, the light emitted from the first light-emitting elements 2 and the light-guiding plate 3 can be uniformly distributed, and the brightness uniformity of the light emitted by the backlight module can be improved.

Optionally, in the direction perpendicular to the plane where the substrate 1 is located, a thickness of the diffusing layer 7 may be 0.1 mm to 0.3 mm.

Figure 22:
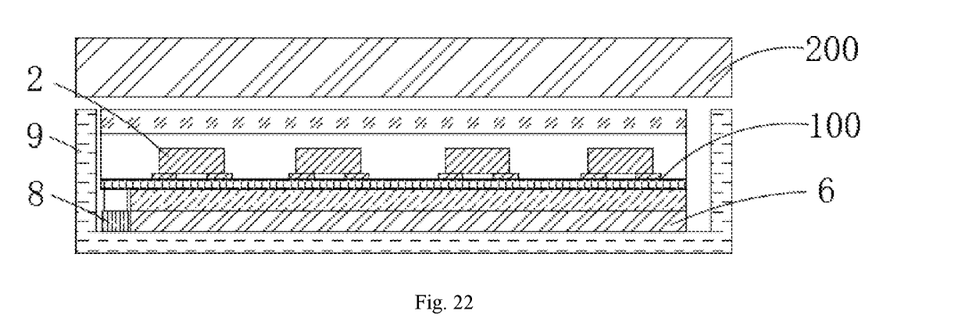
FIG. 22 shows a schematic top view of a display device according to an embodiment.

Referring to FIG. 22, FIG. 22 shows a schematic top view of the display device according to the embodiments.

The embodiments of the present application further provide the display device, including the backlight module 100 according to any one of the embodiments as described above, and a display panel 200, arranged at a light-emitting side of the backlight module 100.

Optionally, the display device further includes a frame body 9, the backlight module can be fixed in the frame body 9, and the driving circuit board 8 and the reflecting sheet 6 of the backlight module 100 are arranged at a bottom of the frame body, and can be fixed by adhesive. Specifically, the frame body 9 may be a resin housing, which can reduce the amount of light loss around the backlight module 100 and improve the utilization rate and the intensity of the surrounding light.

The display device in the present application is a liquid crystal display device. Since the liquid crystal display device cannot emit light by itself, a backlight module 100 needs to be arranged in the liquid crystal display device.

The backlight module 100 of the liquid crystal display device generally adopts blue light emitting diodes, that is, the first light-emitting elements 2 adopt the blue light emitting diodes. In the liquid crystal display device in the related art, the blue light emitting diodes are usually covered with red and green phosphors, and the red and green phosphors covered on the blue light emitting diodes can convert the blue light emitted by the blue light emitting diodes into white light.

However, such the liquid crystal display device in the related art has limited performance in improving a color gamut. In order to further improve the color gamut of liquid crystal display device, in some optional embodiments, A quantum dot enhancement film (QDEF) is arranged at the side of the first light-emitting elements 2 of the backlight module 100 away from the substrate 1, and the quantum dots in the QDEF can convert about two-thirds of the blue light emitted by the first light-emitting elements 2 into red and green light, thus, the liquid crystal display device incorporating the QDEF can have the color gamut comparable to the color gamut of an Organic Light-Emitting Diode (OLED). Compared with the white light emitted by the traditional liquid crystal display device, there are more red, green and blue light passing through a color filter, so that the display can be brighter and the color can be richer.

The above are only specific embodiments of the present application. Those skilled in the art can clearly understand that, for the convenience and brevity of description, the specific working process of the above-described systems, modules and units may refer to the process in the foregoing method embodiments, which will not be repeated here. It should be understood that the protection scope of the present application is not limited to this. Any person skilled in the art can easily think of various equivalent modifications or replacements within the technical scope disclosed in the present application, and these modifications or replacements should all cover within the scope of protection of this application.

It should also be noted that the exemplary embodiments mentioned in the present application describe some methods or systems based on a series of steps or devices. However, the present application is not limited to the order of the above steps, that is, the steps may be performed in the order mentioned in the embodiment, or may be different from the order in the embodiments, or several steps may be performed simultaneously.

What is claimed is:

1. A backlight module, comprising a plurality of first regions and a plurality of second regions arranged adjacently, wherein the backlight module comprises:
   a substrate, comprising a light-transmitting region, wherein the light-transmitting region is at least partially located in the second regions;
   a plurality of first light-emitting elements, arranged at a side of the substrate, wherein the first light-emitting elements are located in the first regions, and the first light-emitting elements emit light along a direction perpendicular to a plane where the substrate is located;
   a light-guiding plate, arranged at a side of the substrate away from the first light-emitting elements, wherein the light-guiding plate comprises a plurality of light-supplementing portions located in the second regions; and
   at least one second light-emitting element, arranged at a side face of the light-guiding plate.

2. The backlight module according to claim 1, wherein the light-supplementing portions are uniformly distributed in the second regions.

3. The backlight module according to claim 1, wherein the light-guiding plate comprises a first light-supplementing region and a second light-supplementing region, and the first light-supplementing region is arranged away from the first light-emitting elements relative to the second light-supplementing region;
   a distribution density of the light-supplementing portions arranged in the first light-supplementing region is greater than a distribution density of the light-supplementing portions arranged in the second light-supplementing region; or,
   an orthographic projection area of each of the light-supplementing portions arranged in the first light-supplementing region on the substrate is larger than an orthographic projection area of each of the light-supplementing portions arranged in the second light-supplementing region on the substrate.

4. The backlight module according to claim 1, wherein each of the light-supplementing portions comprises a protruding portion arranged at a side of the light-guiding plate away from the substrate, and in a direction from the substrate to the light-guiding plate, a cross-sectional area of the protruding portion gradually decreases.

5. The backlight module according to claim 1, wherein each of the light-supplementing portions comprises a plurality of light-guiding strips arranged adjacently, and in a direction from the light-guiding plate to the substrate, a cross-sectional area of each of the light-guiding strips gradually decreases.

6. The backlight module according to claim 5, wherein the light-guiding strips comprise first light-guiding strips and second light-guiding strips arranged apart from each other, at least two first light-guiding strips with a same extending direction form a light-guiding strip group, the second light-guiding strips extend along an arrangement direction of the first light-emitting elements, and an orthographic projection of each of the second light-guiding strips on the substrate is at least partially located between orthographic projections of the two adjacent first light-emitting elements on the substrate.

7. The backlight module according to claim 5, wherein the light-guiding strips comprise first light-guiding strips, at least two first light-guiding strips with a same extending direction form a light-guiding strip group, and extending directions of the first light-guiding strips of two adjacent light-guiding strip groups are different.

8. The backlight module according to claim 5, wherein orthographic projections of the plurality of the light-guiding strips on the substrate are in shapes of concentric rings; or
   an orthographic projections of the light-guiding strips on the substrate are in a shape of rectangle.

9. The backlight module according to claim 1, wherein the substrate is a transparent substrate with a light transmittance greater than 50%.

10. The backlight module according to claim 1, wherein the substrate is a polyimide substrate or a glass substrate, and a thickness of the substrate is less than or equal to 30 µm.

11. The backlight module according to claim 1, wherein a light transmittance of a part of the substrate located in the first regions is lower than a light transmittance of a part of the substrate located in the second regions.

12. The backlight module according to claim 11, wherein a part of the substrate located in the second regions is provided with hollow holes.

13. The backlight module according to claim 1, wherein a light-shielding layer is arranged at a side of a part of the substrate located in the first regions facing the light-guiding plate; and/or
   a light-shielding layer is arranged at a side of a part of the substrate located in the first regions away from the light-guiding plate.

14. The backlight module according to claim 1, wherein the substrate comprises a welding pad at least partially electrically connected to the first light-emitting elements, and an orthographic projection of the welding pad on the light-guiding plate covers an orthographic projection of each of the first light-emitting elements on the light-guiding plate.

15. The backlight module according to claim 1, wherein at least two second light-emitting elements are arranged at the side face of the light-guiding plate, and the second light-emitting elements are symmetrical with respect to a center of the light-guiding plate;
   the second light-emitting elements are fixed at the side of the substrate away from the first light-emitting elements, and the second light-emitting elements are electrically connected to the substrate.

16. The backlight module according to claim 1, wherein at least two second light-emitting elements are arranged at the side face of the light-guiding plate, and the second light-emitting elements are symmetrical with respect to a center of the light-guiding plate;
   the backlight module further comprises a driving circuit board, the driving circuit board is arranged at the side of the substrate away from the first light-emitting elements, and the second light-emitting elements are fixed and electrically connected to the driving circuit board.

17. The backlight module according to claim 16, wherein a reflecting sheet is arranged on a surface of the light-guiding plate at a side away from the first light-emitting elements, and the driving circuit board and the reflecting sheet are arranged in a same layer;
   in the direction perpendicular to the plane where the substrate is located, a sum of a thickness of the reflecting sheet and a thickness of the light-guiding plate is 0.4 mm to 0.6 mm.

18. The backlight module according to claim 1, wherein a reflecting coating layer is arranged on at least a surface of a part of the light-guiding plate located in the second regions at a side away from the first light-emitting elements.

19. The backlight module according to claim 1, further comprising a diffusing layer, wherein the diffusing layer is arranged on a surface of the first light-emitting elements at a side away from the substrate;
   in the direction perpendicular to the plane where the substrate is located, a thickness of the diffusing layer is 0.1 mm to 0.3 mm.

20. A display device, comprising the backlight module according to claim 1;
   a display panel, arranged at a light-emitting side of the backlight module.

\* \* \* \* \*